United States Patent [19]

Murabayashi et al.

[11] Patent Number: 5,119,530
[45] Date of Patent: Jun. 9, 1992

[54] SLIDE FASTENER AND METHOD OF MAKING THE SAME

[75] Inventors: Hiroshi Murabayashi, Tokyo; Akira Nogai; Tomiyoshi Takano, both of Kurobe; Takeshi Imai, Ichihara; Mamoru Okada, Uozu, all of Japan

[73] Assignee: Yoshida Kogyo, K. K., Tokyo, Japan

[21] Appl. No.: 625,367

[22] Filed: Dec. 11, 1990

[30] Foreign Application Priority Data

Dec. 12, 1989 [JP] Japan ................ 1-320444

[51] Int. Cl.⁵ .................................. A44B 19/32
[52] U.S. Cl. .............................. 24/403; 24/389
[58] Field of Search .......... 24/389, 384, 393, 399, 24/403; 524/265, 269

[56] References Cited

U.S. PATENT DOCUMENTS

| | | |
|---|---|---|
| 3,962,519 | 6/1976 | Rusch et al. ............ 524/265 |
| 3,984,600 | 10/1976 | Kawase et al. |
| 4,607,416 | 8/1986 | Tanikawa et al. ........ 24/389 |
| 4,631,307 | 12/1986 | Hosoda et al. ........ 524/269 |
| 4,656,212 | 4/1987 | Hosoda et al. ........ 524/269 |
| 4,817,252 | 4/1989 | Kusayama ............ 24/389 |

FOREIGN PATENT DOCUMENTS

58-13166 3/1983 Japan.

Primary Examiner—Victor N. Sakran
Attorney, Agent, or Firm—Hill, Van Santen, Steadman & Simpson

[57] ABSTRACT

A slide fastener is disclosed which comprises a pair of stringer tapes each having molded thereon a row of coupling elements. The elements is formed from a thermoplastic resin composition containing 0.01-10 weight % of an organopolysiloxane. The resin composition facilitates separation of the stringers from the mold and movement of a slider on the fastener.

2 Claims, 2 Drawing Sheets

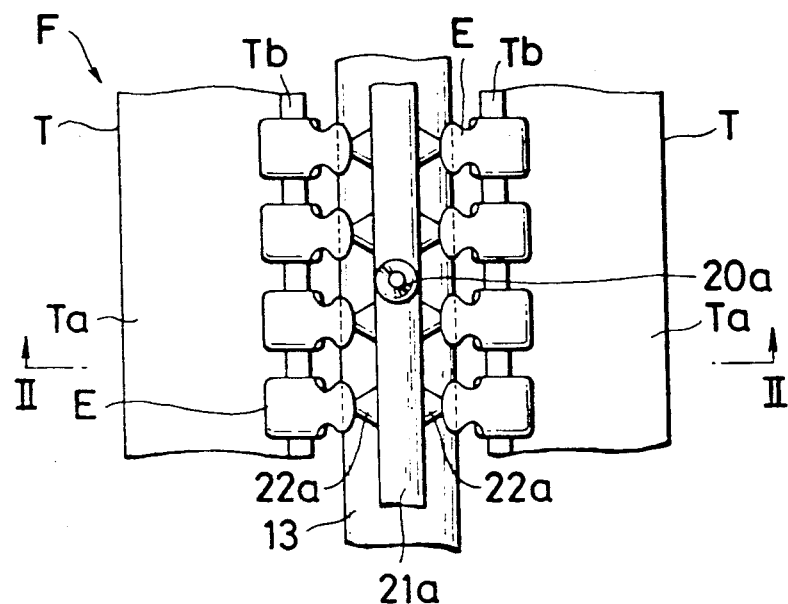
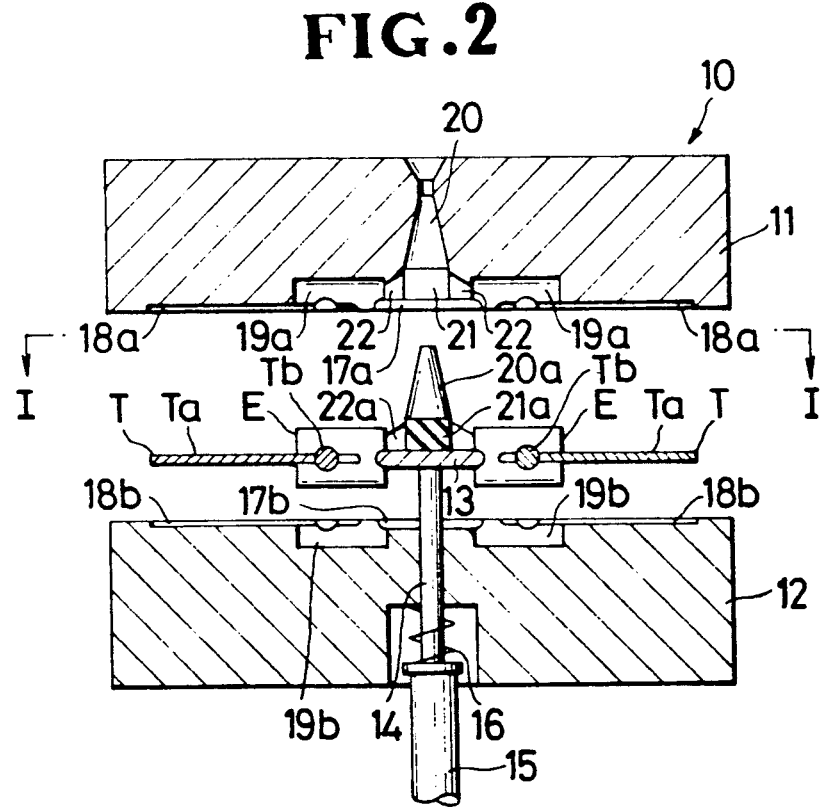

SLIDE FASTENER AND METHOD OF MAKING THE SAME

BACKGROUND OF THE INVENTION

1. Field of the Invention

This invention relates to a slide fastener and a method of making the same. More particularly, the invention is concerned with such a slide fastener which carries thereon coupling elements formed from a thermoplastic material into a discrete structure and which finds wide application on jackets, trausers, shirts, bags, shoes, tents and the like.

2. Prior Art

A typical example of slide fastener having coupling elements made of a thermoplastic resin is disclosed for example in Japanese Patent Publication No. 58-13166. This prior art and other known slide fastener elements still have much to be desired in respect of smoothness with which they are coupled and uncoupled by a slider.

To provide a row of discrete resinous coupling elements on each of a pair of stringer tapes, there is used a split molding machine comprising an upper (stationery) mold and a lower (movable) mold having a longitudinal core strip. On opposite sides of this core strip are formed a multiplicity of mold cavities for receiving and shaping a hot molt of thermoplastic resin into respective individual coupling elements to be attached to and along a longitudinal, usually beaded edge of the stringer tape. The stringer tape or tapes upon hardening of the resin thereon are pulled out from the molds with a pulling force large enough to peel the shaped coupling elements off the core strip, in which instance the pulling force would often be so large that irregularities occur in the interspace or pitch of the coupling elements, resulting in malfunctioned slide fastener.

SUMMARY OF THE INVENTION

It is therefore a primary object of the present invention to eliminate the foregoing difficulties of the prior art by providing an improved slide fastener whose coupling elements are formed from such a thermoplastic resin composition which will contribute to smooth, effective operation of a slider with respect to the coupling elements.

Another object of the invention is to provide a method of making a row of coupling elements for a slide fastener from a thermoplastic resin composition by molding thereof into a discrete coupling structure having a uniform element-to-element interspace or pitch.

According to one aspect of the invention, there is provided a slide fastener comprising a pair of stringer tapes and a row of discrete coupling elements formed from a thermoplastic resin composition and attached at predetermined intervals on a beaded edge of each of the stringer tapes, the coupling elements containing 0.01-10 weight % of an organopolysiloxane normally in the form of liquid or crude rubber.

According to another aspect of the invention, there is provided a method of manufacturing a slide fastener which comprises blending pellets of a thermoplastic resin containing 1-75 weight % of normally liquid or crude rubber-like organopolysiloxane with pellets of a thermoplastic resin free of the organopolysiloxane; stirring the blend with heat until there is obtained a hot melt containing the organopolysiloxane in the range of 0.01-10 weight %, and subjecting the hot melt to split injection molding to form a row of discrete coupling elements on a beaded edge of a stringer tape.

The above and other objects and features of the invention will be better understood from the following detailed description taken in conjunction with the accompanying drawings which illustrate by way of example a preferred embodiment.

BRIEF DESCRIPTION OF THE DRAWINGS

FIG. 1 is a plan view of a split mold for injection-molding a row of coupling elements on each of a pair of stringer tapes, the view being taken on the line I—I of FIG. 2;

FIG. 2 is a transverse cross-sectional view taken on the line II—II of FIG. 1;

DETAILED DESCRIPTION

Figure 4:
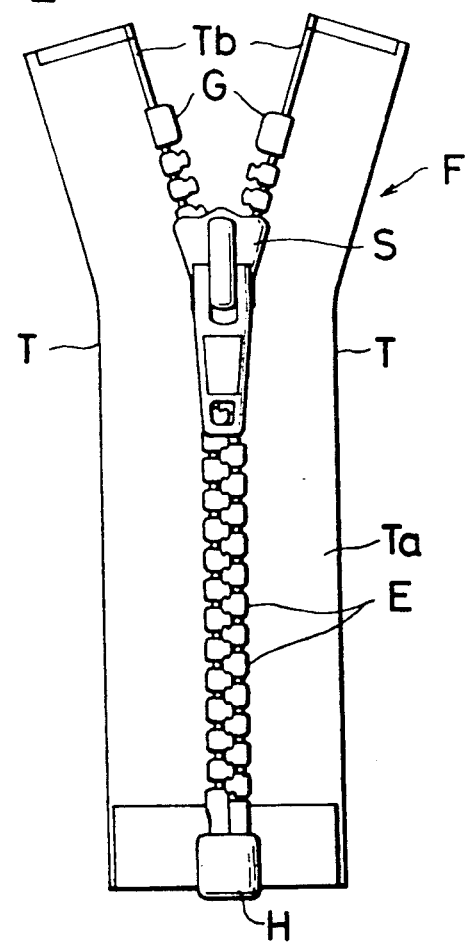
FIG. 4 is a plan view of one example of slide fastener product provided in accordance with the invention.

Referring now to the drawings and firstly to FIG. 4, there is shown a typical example of a slide fastener F embodying the invention which comprises a pair of stringer tapes T, T each carrying along their respective longitudinal beaded inner edge Tb, Tb a row of discretely formed coupling elements E. A slider S is mounted on the slide fastener F for reciprocative movement to take the opposed rows of coupling elements E into and out of engagement with each other; i.e., to close and open the slide fastener F in a manner well known in the art. End stop members G and H are attached respectively to the top and bottom ends of the fastener F for limiting thereat the movement of the slider S as is also well known.

According to the invention, the coupling elements E are formed, as by injection-molding as hereinafter described, from a thermoplastic resin composition comprising predominantly polyacetal, polyester, nylon and the like and importantly containing normally liquid or crude rubber-like organopolysiloxane in the range of 0.01-10 weight percent based on the resin. Specific examples of such organopolysiloxane include dimethylpolysiloxane, methylalkylpolysiloxane, methylvinylpolysiloxane, methylphenylpolysiloxane and methyl (trifluoropropyl) polysiloxane. Their molecular structure is typically of a linear chain but may be of a branched chain or cyclic.

The organopolysiloxane to be incorporated in the thermoplastic resin composition according to the invention is normally liquid or in the form of a crude rubber having a viscosity of greater than 10 CSt to preclude volatilization and preferably above 1,000,000 CSt to assume a crude rubber-like state so as to provide effective molding of the resin and smooth sliding relative movement between the coupling elements E and the slider S. To this end, the slider S is also preferably formed from a similar thermoplastic resin containing 0.01-10 weight percent of the specified organopolysiloxane, although the slider may be otherwise metallic or ceramic in the practice of the invention.

The organopolysiloxane is added in an amount of 0.01-10, preferably 0.05-5 weight percent based on total thermoplastic resin. Smaller than 0.01 weight percent would give no appreciable improvement in regard to relative sliding movement between the coupling elements E and the slider S. Greater than 10 weight percent of organopolysiloxane would result in reduced mechanical strength and unpleasant touch of the coupling elements E.

There is no particular restriction imposed upon the method of admixing the organopolysiloxane with the thermoplastic resin. The former may be added to and well kneaded with the latter which has been heated to melt in advance. Advantageously, a first batch of resin containing highly concentrated organopolysiloxane is pelletized and admixed with a second batch of resin free of organopolysioxane which is likewise pelletized, the pelletized admixture being heated to melt, in which instance the concentration of organopolysiloxane is such that its contents in the resulting resin composition are in the range of 0.01-10 weight percent. This procedure ensures homogeneous dispersion of the organopolysiloxane in the thermoplastic resin. The first batch of resin contains preferably 1-75 weight percent of organopolysiloxane, more preferably 15-60 weight percent of crude rubber-like organopolysiloxane.

Figure 3:
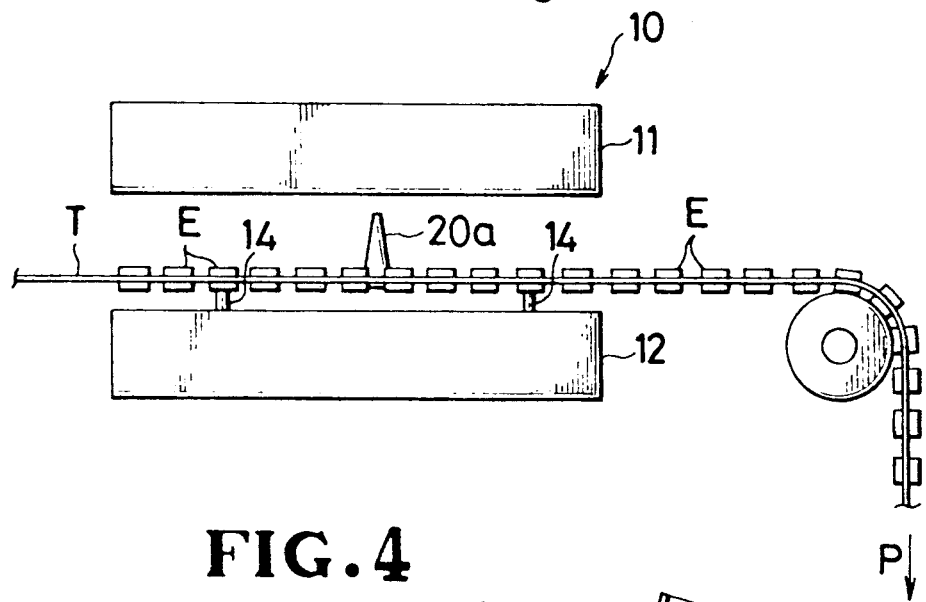
FIG. 3 longitudinal side elevation of the split mold shown separated for advancing the slide fastener stringers.

Reference to FIGS. 1-3 inclusive shows a split type of injection molding apparatus 10 which is used in the production of elongate slide fastener stringers each having a row of discrete coupling elements E formed on the stringer tape T. The apparatus 10 comprises an upper mold 11 which is stationery and a lower mold 12 which is vertically movable toward and away from the upper mold 11. A core 13 extends longitudinally centrally of the split mold 10 and is supported on a vertical support pin 14 extending from an ejector 15 through the lower mold 12. A spring 16 is adapted to normally urge the core 13 downwardly against a recess 17b formed in the upper or inner surface of the lower mold 12.

A similar recess 17a is formed in the inner surface of the upper mold 11 for receiving the core 13. A pair of tape receiving recesses 18a, 18b are formed in the inner surfaces of the upper and lower molds 11 and 12, respectively, and extend in parallel on opposite longitudinal sides of the core receiving recesses 17a and 17b. The recesses 18a and 18b are each dimensioned to receive a web portion Ta of the respective tape T.

A multiplicity of molding cavities 19a and 19b in opposed rows are formed in close proximity to the respective core receiving recesses 17a and 17b and in communication with the respective tape receiving recesses 18a and 18b. The molding cavities 19a and 19b are each dimensioned to produce a coupling element E of desired size and shape on and along each of the longitudinal beaded edges Tb, Tb of the respective tapes T, T.

A sprue 20 is formed in the upper mold 11 in communication with the core receiving recess 17a for introducing a hot melt of thermoplastic resin into the molding cavities 19a and 19b. An elongate runner 21 is formed under and in communication with the sprue 20 and extends longitudinally of the upper mold 11. The runner 21 is adapted to distribute the hot melt over and into a multiplicity of paired gates 22 branched off from opposite sides of the runner 21 at predetermined intervals or pitches registering with the respective cavities 19a, 19b.

With this construction of the molding apparatus 10, the stringer tapes T, T are placed with their web Ta on the respective recesses 18a, 18b and with their beaded edges Tb extending into the respective cavities 19a, 19b. The molds 11 and 12 are then closed. A hot melt of thermoplastic resin of the inventive composition is fed through the sprue or sprues 20 to flow into the runner 21 and thence through the gates 22 into the cavities 19a, 19b. Upon cooling and hardening of the thermoplastic resin, the lower mold 12 is moved downward apart from the upper mold 11, followed by actuation of the ejector 15 to lift the core 13 thereby separating from the lower mold 12 the stringer tapes T, T with the coupling elements E formed thereon together with all residual replicas 20a, 21a, 22a of the sprue 20, runner 21 and gates 22, respectively as shown in FIG. 2. The stringer tapes T, T are thereafter moved unidirectionally as indicated by the arrow P in FIG. 3 and pulled apart from the core 13, in which instance the separation of molded coupling elements E from the core 13 is effected with a minimum of pull according to the invention.

The invention will be further described by way of the following examples taken in connection with the thermoplastic resin compositions to be used as the hot melt material for molding the coupling elements E on the stringer tapes T, T. The viscosities noted in the reference and inventive examples are those measured at 25° C.

REFERENCE EXAMPLES 1

50 weight parts of polyacetal (TENAX, tradename, manufactured by Asahi Chemicals Co., Ltd.) and 50 weight parts of crude rubber-like dimethylpolysiloxane having a molecular weight of 500,000 and a viscosity of 5,000,000 CSt were introduced into a kneader-mixer and stirred at 250° C. for 10 minutes until there was obtained a homogeneous melt. This melt was extruded like strings into water and pelletized. The resulting pellets are referred to herein as SA-1.

INVENTIVE EXAMPLE 1

Polyacetal (TENAX) pellets and SA-1 pellets were blended in a ratio of 99.75 weight % and 0.25 weight % and stirred in a mixer at room temperature until there was obtained a homogeneous mix. This mix was subjected to injection molding by a split mold (such as shown in FIGS. 1-3) in a monoxial injection molding machine thereby producing a pair of slide fastener stringer each having molded thereon a row of coupling elements E containing 0.125 weight % of dimethylpolysiloxane. The stringers were pulled out or separated from the mold, in which instance the pulling force was measured to read 15.2 kg. The stringers were provided with a slider S of a metallic material to produce a slide fastener F such as shown in FIG. 4. The slider was manipulated to open and close the slide fastener F, in which instance the pulling force was measured to read 390 grams on opening and 430 grams on closing.

INVENTIVE EXAMPLE 2

The procedure of Inventive Example 1 was followed except that 99.875 weight % of polyacetal was used and mixing was continued until there was obtained 0.125 weight % of SA-1. Crude rubber-like dimethylpolysiloxane contents in the resulting coupling elements E were 0.0625 weight %. The pulling force required to separate the stringers from the mold was 20.2 kg. The pull required to open the stringers with a metallic slider was 490 grams.

COMPARATIVE EXAMPLES 1

The procedure of Inventive Example 1 was followed in the preparation of slide fastener stringers, except for the absence of SA-1. The stringers were removed from the mold with a pull measuring 26.8 kg. Slider pull for opening the stringers was 530 grams and for closing the stringers was 680 grams.

REFERENCE EXAMPLE 2

The procedure of Reference Example 1 was followed except that nylon 6,6 (tradenamed AMILAN manufactured by Toyo Rayon Co., Ltd.) and polybutyleneterephthalate (tradenamed PBT manufactured by Toyo Rayon Co., Ltd.) were used in place of polyacetal to produce their respective pellets SA-2 and SA-3 each containing 50 weight % of crude rubber-like dimethylpolysiloxane.

REFERENCE EXAMPLE 3

The procedure of Reference Example 1 was followed except that 20 weight % of liquid dimethylpolysiloxane having a molecular weight of 30,000 and a viscosity of 10,000 CSt was used to produce polyacetal pellets SA-4 containing 20 weight % of liquid dimethylpolysiloxane.

INVENTIVE EXAMPLE 3

The procedure of Inventive Example 1 was followed except that 99.75 weight % of nylon 6,6 pellets and 0.25 weight % of SA-2 were used. The coupling elements E on the resulting stringers contained 0.125 weight % of liquid dimethylpolysiloxane. Pull force on the stringers when separated from the mold was 16.3 kg.

COMPARATIVE EXAMPLE 2

The procedure of Inventive Example 3 was followed except that nylon 6,6 pellets alone was used. The resulting stringers were separated from the mold with a pull force amounting to 30.2 kg.

INVENTIVE EXAMPLE 4

The procedure of Inventive Example 1 was followed except that 99.75 weight % of polybutyleneterephthalate pellets and 0.25 weight % of SA-3 were used. Crude rubber-like dimethylpolysiloxane contents in the coupling elements E on the resulting stringers were 0.125 weight %. The pull force measured for separating the stringers from the mold was 18.6 kg.

COMPARATIVE EXAMPLE 3

The procedure of Inventive Example 4 was followed except that polybutyleneterephthalate pellets alone were used. The pull force required for separating the resulting stringers from the mold was 29.6 kg.

INVENTIVE EXAMPLE 5

The procedure of Inventive Example 1 was followed except that 98.7 weight % of polyacetal pellets and 1.3 weight % of SA-4 were used. Liquid dimethylpolysiloxane contents in the coupling elements E were 0.65 weight %. The pull force for separating the stringers from the mold was measured to read 19.0 kg.

INVENTIVE EXAMPLE 6

The procedure of Inventive Example 5 was followed except that 97.5 weight % of polyacetal pellets and 2.5 weight % of SA-4 were used. Liquid dimethylpolysiloxane contents in the coupling elements E were 1.25 weight %. The stringers were separated from the mold with a pull of 13.9 kg.

INVENTIVE EXAMPLE 7

The procedure of Inventive Example 1 was followed except that 99.5 weight % of polyacetal pellets and 0.5 weight % of SA-1 were used. Crude rubber-like dimethylpolysiloxane contents in the coupling elements E were 0.25 weight %. The pull force required for separating the stringers from the mold was 9.6 kg.

What is claimed is:

1. A slide fastener comprising a pair of stringer tapes and a row of discrete coupling elements formed from a thermoplastic resin composition and attached at predetermined intervals on a beaded edge of each of said stringer tapes, said coupling elements containing 0.01-10 weight % of an organopolysiloxane normally in the form of liquid or crude rubber.

2. A slide fastener according to claim 1 wherein said organopolysiloxane is selected from the group consisting of dimethylpolysiloxane, methylalkylpolysiloxane, methylvinylpolysiloxane, methylphenylpolysiloxane and methyl(trifluoropropyl)polysiloxane.

* * * * *